US007911723B2

(12) United States Patent
Mochizuki et al.

(10) Patent No.: US 7,911,723 B2
(45) Date of Patent: Mar. 22, 2011

(54) METHOD FOR MEASURING OFFSET AMOUNT BETWEEN HEADS IN A COMPOSITE MAGNETIC HEAD AND A MEASURING DEVICE USING THE METHOD

(75) Inventors: Hideki Mochizuki, Kodama-gun (JP); Yoshihiro Sakurai, Kodama-gun (JP); Toshiaki Suzuki, Kodama-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 52 days.

(21) Appl. No.: 12/506,293

(22) Filed: Jul. 21, 2009

(65) Prior Publication Data

US 2010/0020427 A1 Jan. 28, 2010

(30) Foreign Application Priority Data

Jul. 23, 2008 (JP) ................................. 2008-189623

(51) Int. Cl.
*G11B 27/36* (2006.01)
(52) U.S. Cl. ......................................................... 360/31
(58) Field of Classification Search ........................ None
See application file for complete search history.

(56) References Cited

U.S. PATENT DOCUMENTS 6,456,451 B1* 9/2002 Asano et al. ............... 360/77.04
2009/0310249 A1* 12/2009 Michinaga ................. 360/77.02

FOREIGN PATENT DOCUMENTS

| JP | 2000-231707 A | 8/2000 |
| JP | 2007-012119 A | 1/2007 |
| JP | 2007-149155 A | 6/2007 |

* cited by examiner

*Primary Examiner* — Daniell L Negrón
(74) *Attorney, Agent, or Firm* — Mattingly & Malur, P.C.

(57) ABSTRACT

An offset amount between heads is calculated by positioning a head in a designated track under an ON track servo control, obliquely writing test data by moving the head in a radial direction of the magnetic recording medium at a designated moving speed K to cross the designated track and at least one track adjacent to the designated track according to a write start signal, reading the oblique test data by the read head from the adjacent track under the ON track servo control, detecting a peak position of a read voltage by using a read voltage characteristics of the read signal in the adjacent track and calculating the offset amount between the heads by detecting a scan time up to the peak position of the read voltage.

11 Claims, 4 Drawing Sheets

METHOD FOR MEASURING OFFSET AMOUNT BETWEEN HEADS IN A COMPOSITE MAGNETIC HEAD AND A MEASURING DEVICE USING THE METHOD

TECHNICAL FIELD

This invention relates to a method for measuring offset amount between heads in a composite magnetic head and a measuring device using the method. In detail, in a composite magnetic head composed of an MR (magnetic resistance effect) head (read head) and a thin film inductive head (write head), this invention relates to an offset amount measuring method between the heads and a measuring device used in the method with which the offset amount between the heads of the composite magnetic head can easily measured by accessing a track of a magnetic recording medium (discrete track medium (DTM)) of a discrete track system having track width narrower than a write sensitive width of the thin film inductive head.

BACKGROUND ART

The hard disk (HDD) for a disk of 3.5 to 1.8 inches or even 1.0 inch or less has been used in various fields of automobile products, home electrical appliances and audio appliances, etc. Therefore, the reduction of cast of hard disk drive and the mass production thereof have been requested and the large memory capacity thereof has been also requested.

In order to satisfy these requests, there is a tendency that the high density recording magnetic disk media of the vertical magnetic memory system, which has lately been put to practical use, has been employed in the above mentioned fields and spread rapidly.

The magnetic disk medium of the vertical magnetic memory system is used in a composite magnetic head having a TMR (tunnel magneto-resistance) head or a GMR (giant magneto-resistance) head, which is a memory medium separable from the head by 10 nanometer or less controllably.

Such magnetic disk medium generally includes a glass substrate, a soft magnetic layer formed on the glass substrate and a magnetic layer provided on the soft magnetic layer. Discrete tracks are formed in a discrete substrate by etching the magnetic layer. (Incidentally, the term "disk substrate" is used as a material of a magnetic disk to be mounted on a hard disk drive.)

The etching for forming grooves between tracks is performed through an uneven photo-resist film. The unevenness of the photo-resist film is formed by using the nano-print lithography and pushing the photo-resist film with an uneven stamper. The track width of the discrete track formed by the dry etching through the uneven photo-resist is 100 nm or less and the groove separating adjacent tracks is filled with a non-magnetic material in a later step.

Such technique is described in JP-2007-012119A and JP-2007-149155A, etc., and is well known.

The magnetic disk of this kind is called as a magnetic recording medium of the discrete track system (DTM) and is currently paid attention to a technique capable of realizing ultra high density recording exceeding 1 terabit/(inch)$^2$ for 2.5 inches several years later. Further, the bit patterned medium (BPM) having discrete tracks, which are finely separated magnetically in the track direction, has been entered into the practical implementation step recently.

Since a magnetic film of the prior art magnetic disk used in HDD is formed on the whole surface of the medium, the prior magnetic disk is easily possible to record test data (test burst signal) in arbitrary track by a write head. Therefore, the read voltage characteristics, that is, the read characteristics profile (waveform), with respect to the moving distance of the read head crossing the track can be obtained easily by reading test data recorded in the track while moving the read head continuously in radial direction of the disk. With the profile of the read characteristics, the write sensitive width of the write head and the read sensitive width of the read head can easily be measured as the characteristics parameter of the composite magnetic head in the magnetic head test and, therefore, the composite magnetic head can be evaluated or tested.

Figure 5:
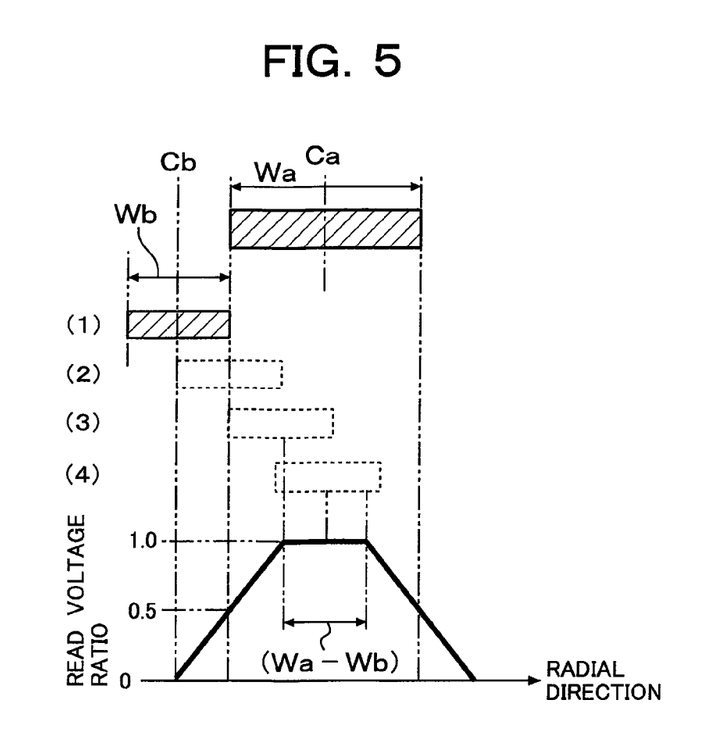
FIG. 5 shows a conventional magnetic head characteristics measuring method for measuring a write sensitive width of a write head and a read sensitive width of a read head as a magnetic head characteristics parameter.

FIG. 5 explains a prior art measuring method for measuring a write sensitive width of a write head and a read sensitive width of a read head as characteristics parameters of a magnetic head.

In FIG. 5, it is assumed that a write of test data in a designated track with write sensitive width Wa by a composite magnetic head (write head) has been complete already. In a read step of the test data, the test data is read by moving the composite magnetic head (read head) rightward in the drawing along a radial direction of the disk across the designated track.

In a position (1) shown in FIG. 5, a right side end of a read sensitive width Wb of an MR head (read head) corresponds to a left side of the write sensitive width Wa of the test data. At this time, a gap (center line Cb) of the MR head can read the test data (the left side end thereof) written by the write head. In this case, the read voltage is still 0 (zero).

In order to simplify the description, the unit of the read voltage of the MR head is no [mV] but a ratio in a range between numerical value "0" and numerical value "1" under a maximum read voltage of the test data being 1. Incidentally, each of the sensitive widths Wa and Wb of the heads is determined by the gap width of the heads. The write sensitive width Wa of the write head (thin film inductive head) was usually in the order of several μm. In the DTM, the write sensitive width of the write head is in the order of 50 nm to 80 nm and the track width is 50 nm or less. Further, when the DTM rotates, the formed track is eccentric. Therefore, even if the write sensitive width of the write head is close to the track width substantially, there is a problem that the track width becomes narrower than the write sensitive width of the write head in the data recording state.

At a position (2), the read sensitive width Wb of the MR head enters into the side of the write sensitive width Wa by Wb/2. Therefore, Wb/2 of the right side of the read sensitive width Wb becomes on the write sensitive width Wa. In this state, the read voltage becomes 0.5 when the test data is written uniformly. When the MR head is moved rightward further to the a position (3), the read sensitive width WB overlaps the write sensitive width WA completely. Therefore, the maximum read voltage becomes 1.0. When Wa>Wb, the voltage in the width range (Wa-Wb) becomes 1.0 evenly and the read voltage becomes flat. Therefore, when MR head is at a position (4), the read voltage is 1.0. As a result, it is possible to obtain the profile (waveform) of the read voltage characteristics having a center flat portion as shown by a thick solid line. Incidentally, the head parameter measuring method of this kind is described in JP-2000-231707A and known publicly.

When the track width becomes narrower than the write sensitive width Wa of the write head as in the DTM, the read head can not cross the whole write region determined by the write sensitive width even if the read head is moved in radial direction. Therefore, there is the problem that the profile of the read voltage characteristics shown in FIG. 5 can not be obtained. Further, since the read sensitivity width of the read head in the DTM becomes close the track width, it is impossible to obtain the profile having the center flat portion as shown in FIG. 5. Therefore, it becomes difficult to measure the write sensitive width of the write head and the read sensitive width of the read head.

In order to solve the problem, the applicant of this application filed U.S. application Ser. No. 12/370,245 (corresponding to Japanese Patent Application 2008-106452).

However, the subject invention is a technique for measuring not an offset amount Δx between heads but a sensitive width. Incidentally, the measurement of an offset amount between heads is described in the invention disclosed in U.S. patent application Ser. No. 12/370,254 (corresponding to Japanese Patent Application No. 2008-89468).

As described in U.S. patent application Ser. No. 12/370,254, the offset amount between heads corresponds to a lag between a write center (gap position) of a write head and a read center (gap position) of a read head. In the read voltage characteristics, the offset amount is usually measured as a moving distance from a position in which the composite magnetic head is positioned in an aimed track and a voltage value of a test data, which is written by the write head of the composite magnetic head, is read out by the read head to a position in which the read voltage of the read head becomes a peak voltage value by moving the read head in radial direction of the disk.

However, since, in the invention described in U.S. patent application Ser. No. 12,370,245, the test data is written obliquely with respect to the track, the start position of the test data write does not coincident with the position in the aimed track in which the composite magnetic head is positioned. That is, when the test data is written obliquely, a technique for measuring an remaining offset amount Δx between the write head and the read head is necessary as a measuring method of the head parameter.

SUMMARY OF THE INVENTION

An object of this invention is to provide an offset amount measuring method for easily measuring an offset amount between heads of a composite magnetic head with respect to a DTM, etc., having track width narrower than a write sensitive width of a write head or to provide an offset measuring device for performing the method.

In order to achieve this object, the method or device for measuring an offset amount between heads of the composite magnetic head is composed of the steps of writing a test data obliquely in a designated track and at least one track adjacent to the designated track of one of DTM, BPM or a recording layer having uneven pattern by moving a composite magnetic head positioned in the designated track under ON track servo control in which a servo information is read out from the designated track of such as DTM, BPM or a recording layer having uneven pattern, at a designated moving speed K in a radial direction of according to a write start signal by crossing the designated track, reading the test data by the read head by positioning the composite magnetic head in the adjacent track under the ON track servo control, detecting a peak position of a read signal read out by the read head, obtaining a scan time of the read head from a starting time of the write start signal to the peak position of the read signal, obtaining a relative moving distance in the radial direction of the read head with respect to the test data written in an area from a write start position to the peak position of the read signal by multiplying the scan time with the designated moving speed K and calculating the offset amount between the heads with using a difference between the relative moving distance and a distance between the designated track and the adjacent tracks.

As described, in this invention, the composite magnetic head is positioned in the designated track (start track) of DTM, BPM or a recording layer having uneven pattern under the ON track servo control. Then, a test data is written obliquely in the designated track by moving the write head at the designated moving speed K in radial direction across the designated track to the adjacent track according to the write start signal. The test data obliquely written in the adjacent track is read out under the ON track servo control to obtain the read voltage characteristics in the adjacent track and the scan time up to the peak position of the read voltage.

The detected scan time corresponds to a moving distance in radial direction from a center position of a designated track (start track) at the write start time (write start position of write head) to a position of a read peak voltage of the test data written by moving the write head in the radial direction.

That is, the obliquely written test data is written from the start track to an adjacent track by moving the write head circumferentially and in radial direction. Therefore, the inclination angle is changed correspondingly to the moving speed of the head in radial direction. Assuming that the rotation speed of the disk at the read time point is the same as the write time point (this is usual write/read of the disk), a passage of the track scan time of the read head moving from the write start signal in the track direction coincides with a passage of the moving time of the write head (composite magnetic head) from the write start signal at the center (write start position of the write head) of the start track to the adjacent track in radial and track directions for obliquely writing the test data in the adjacent track. Therefore, the moving distance of the test data corresponds to the scan time of the read head.

In this invention, the test data written obliquely in a track and an adjacent track thereto by the write head is scanned by the read head after a designated passage of time from the write stat signal. The test data to be read is a test data which is written in a certain track in the time passage from the write start signal by the write head. Considering only a certain track by ignoring the time passage from the write start signal, the data written by the write head which is moving in radial direction at the moving speed K is read out by scanning the test data by the read head. Since the read head reads the test data, which is recorded obliquely in the track by moving the write head in the radial direction, with the passage of the scan time, the reading of the read head is performed for the test data which moves in the radial direction with the passage of the scan time. The read head becomes a movement side if the moved test data in the radial direction is supposed a fixed side. As a result, the moving read head reads the fixed test data from the track.

On the other hand, considering the scan time of the read head from the write start signal to the test data obliquely written in the track, the scan time corresponds to a time which is necessary to move the write head from the start track to a certain track in the radial direction.

On the other hand, the offset amount between the heads can be calculated as a distance between the center position of a track on which the write head is positioned and the peak position of the read voltage of the read head.

Therefore, in this invention, the offset amount between the heads is calculated as a difference between the distance from the write start position to the peak position of the read voltage in the adjacent track and the distance between the track centers.

In concrete, the offset amount Δx between the heads can be calculated by the following equation $$\Delta x = d - K \cdot td$$

where d is a moving distance (distance between track centers) of the write head from a center of a start track of the write start signal (write start position of the write head) to a center of the adjacent track in the radial direction, td is a scan time of the read head from the write start signal generation to a peak position of the read signal in the adjacent track and K is a moving speed in the radial direction when the test data is written.

In DTM or BPM in which a track width is narrower than the write sensitive width of the write head, when a composite magnetic head is positioned in an arbitrary track under the ON track servo control, the write center (gap position) of the write head is positioned in a center of an arbitrary track substantially. Therefore, the relation defined by the above equation is established.

Incidentally, when the record of the test data is inclined, the ratio of the read voltage characteristics profile of the read head is merely changed correspondingly to the inclination of the test data, which moves in the radial direction, with respect to a vertical direction. Therefore, the relation defined by the above equation is established.

As a result, the offset amount between the heads can be measured by writing the test data obliquely in an area covering the adjacent tracks in DTM or BPM in which the track width is narrower than the write sensitive width of the write head.

DESCRIPTION OF THE PREFERRED EMBODIMENT

Figure 1:
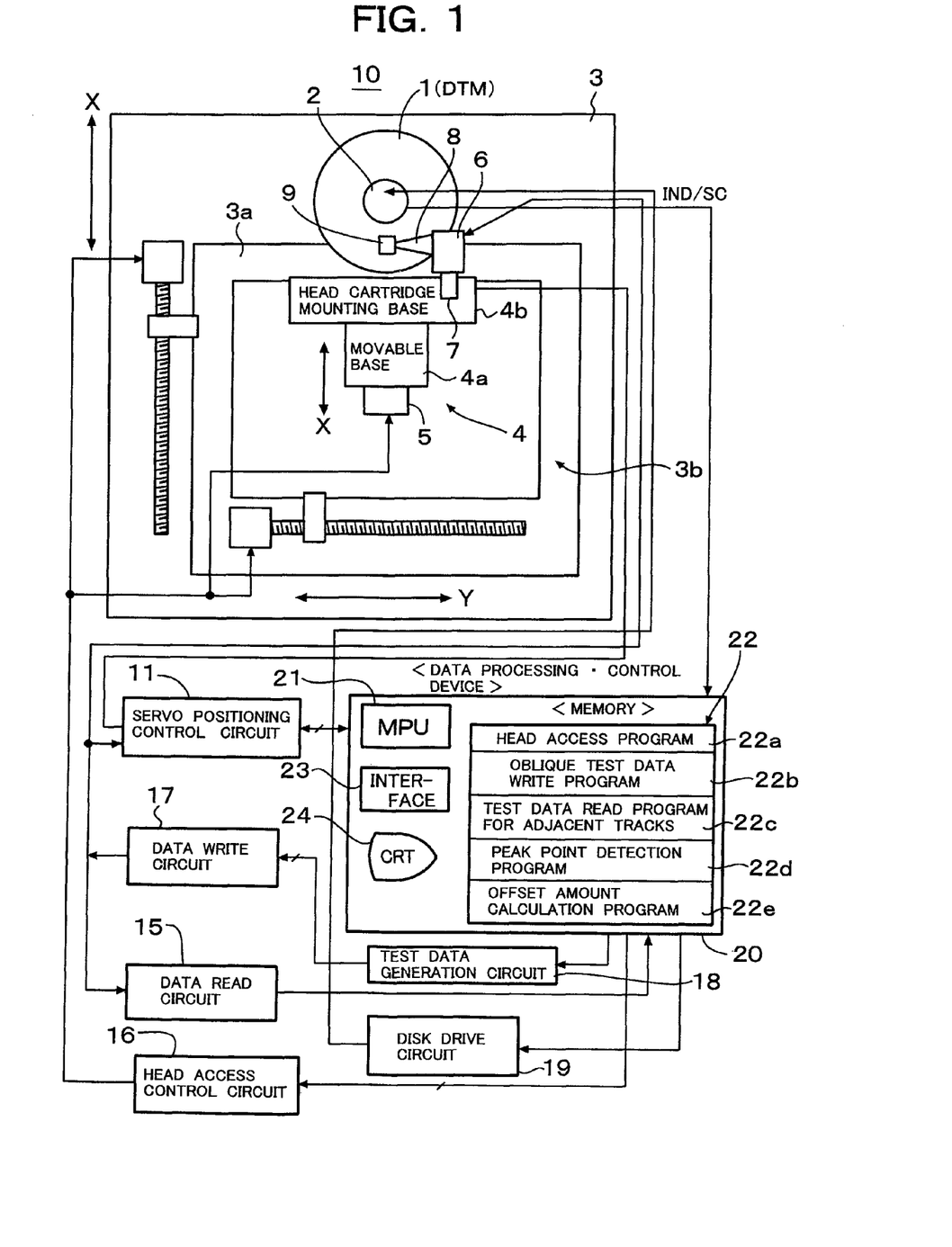
FIG. 1 is a block diagram of a characteristics measuring device (magnetic head tester) of an MR composite magnetic head for measuring offset amount between heads of a composite magnetic head according to an embodiment to which an offset amount measuring method of the present invention is applied.

In FIG. 1, a reference numeral 10 depicts a magnetic head tester and a reference numeral 1 depicts a DTM (discrete track medium) which is mounted on a spindle 2 detachably. An XY stage 3 as a head carriage is provided adjacent to the spindle 2. The XY stage 3 is composed of an X stage 3a and a Y stage 3b.

Incidentally, the DTM 1 is a disk whose discrete tracks are eccentric with respect to a rotation center of the spindle 2 when it is mounted on the spindle 2. In a usual DTM, a center of the DTM is eccentric with respect to a rotation center of a spindle 2 and a center of discrete tracks formed in the DTM are eccentric with respect to the center of the DTM. Therefore, the tracks formed in the disk become eccentric with respect to the rotation center of the spindle unless the eccentricity is corrected stepwise. For this reason, it can be said that 2 tracks or more become eccentric in the DTM 1 mounted on the spindle 2.

As a result, it is impossible to trace the tracks by the composite magnetic head 9 unless an ON track servo control is performed.

The X stage 3a is movable in a radial direction of the DTM 1 so that a piezoelectric stage 4 on which a composite magnetic head 9 which has the MR head (read head) and the thin film inductive head (write head) and is an object to be tested is mounted is movable in the radial direction of the DTM 1 through the Y stage 3b.

The Y stage 3b is mounted on the X stage 3a for moving the head 9 for a skew regulation with respect to the head 9. The piezoelectric stage 4 for finely regulating a position of the head 9 in X direction is mounted on the Y stage 3b.

The piezoelectric stage 4 is composed of a movable base 4a, a had cartridge mounting base 4b and a piezoelectric actuator 5. The head cartridge mounting base 4b is connected to a top side of the movable base 4a. The movable base 4a is mounted on the Y stage 3b through the piezoelectric actuator 5 to move the head cartridge mounting base 4b along X axis.

Thus, when the piezoelectric actuator 5 is driven, the head cartridge mounting base 4b moves in X direction and the fine regulation of the head position in the radial direction of the DTM 1 is performed through a head cartridge 6. Incidentally, the X direction is coincident to a radial direction passing through the center of the DTM 1.

The head cartridge 6 is mounted on the head cartridge mounting base 4b through the piezoelectric actuator 7 and a suspension spring 8 is fixed onto the head cartridge 6. The piezoelectric actuator 7 may be mounted inside of the head cartridge 6. In such case, the piezoelectric actuator is mounted between the suspension spring 8 and a head mounting base of the suspension spring 8 of the head cartridge 6 in such a way that the head 9 can be moved radially through the suspension spring 8. Since, in this case, the mass to be driven by the piezoelectric actuator 7 becomes small, it is possible to improve the responsibility of the ON track servo control.

The head 9 is mounted on a top end side of the suspension spring 8. The head 9 performs the so-called head access operation for reading data from one of the tracks of the DTM 1 or writing data in the track by moving the head 9 radially along the X axis direction of the DTM 1 to scan the tracks of the DTM 1 and positioning the head 9 in the track.

The head cartridge 6 mounts the head 9 on a head carriage detachably and includes a read amplifier and a write amplifier therein. The read amplifier receives a read signal from the MR head, amplifies the read signal and outputs the amplified signal to a data read circuit 15 and a servo positioning control circuit 11.

The servo positioning control circuit 11 is composed of an aimed position voltage generator circuit, a servo voltage demodulation·position voltage arithmetic circuit, an error voltage generator circuit, a phase compensation filtering circuit for the piezoelectric actuator 7 on the cartridge side and a piezoelectric actuator driver, etc., and reads servo information provided correspondingly to sectors to perform the servo control (ON track servo control) in such a way that the head 9 becomes ON track state with respect to the aimed track positioned correspondingly to the servo information.

Incidentally, the servo information is usually composed of a 4-phase burst signal having A phase, B phase, C phase and D phase which are sequentially separated by W/4 each other in the radial direction of a track having width of W.

The data read circuit 15 receives a read signal of the MR head from a read amplifier provided in the head cartridge 6, binarizes the read signal and sends the designated signal to a data processing•control device 20. A reference numeral 16 depicts a head access control circuit. The head access control circuit 16 receives a control signal from the data processing•control device 20 to drive the XY stage 3 and the piezoelectric actuator 5 to thereby position the head 9 in a designated track. A reference numeral 17 depicts a data write circuit and a reference numeral 18 depicts a test data generation circuit. The test data generation circuit 18 generates a designated test data under control of the data processing•control device 20 and sends the test data to the data write circuit 17. The data write circuit 17 generates a write signal according to the test data, drives a write amplifier provided in the head cartridge 6 and writes the data in a designated track through the thin film inductive head of the head 9.

Incidentally, a reference numeral 19 depicts a disk drive circuit and the head access control circuit 16 and the XY stage 3 as the head carriage construct a positioning mechanism of the composite magnetic head of this invention.

Figure 4:
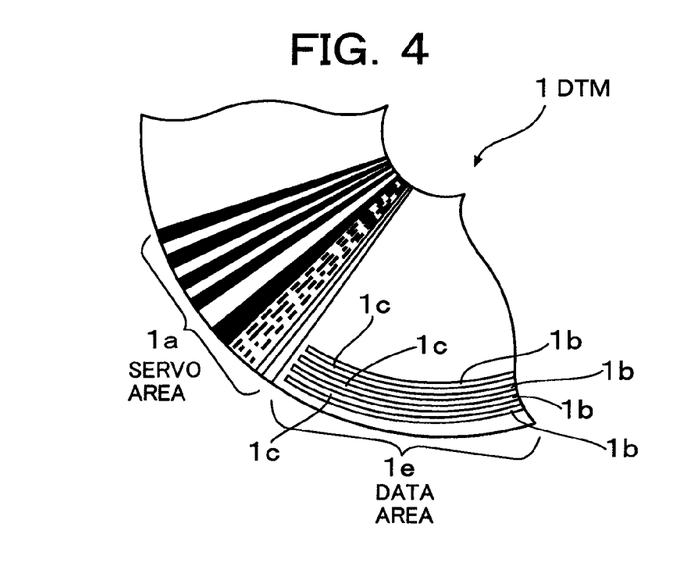
FIG. 4 shows a track of DTM accessed by a magnetic head to be tested.

FIG. 4 shows about one forth section of the DTM 1 to explain the portion of the DTM, which is accessed by a magnetic head to be tested.

Servo areas 1a corresponding to respective sectors are provided in the DTM 1. In the servo area 1a, track position information, servo information (servo burst signal) for determining ON track position and a sector number, etc., are recorded. Following the servo areas, discrete tracks 1b are formed, respectively, and an area between the adjacent discrete tracks 1b is filled with a no-magnetic member 1c.

The discrete tracks 1b constitute a data area 1e in which the test data, etc., is written. The width of the discrete track 1b is in the order of 50 nm to 60 nm. The write sensitive width Wa of the head 9 is 60 nm or more at present.

Returning to FIG. 1, the data processing•control device 20 is constructed with an MPU 21, a memory 22, an interface 23, a CRT display 24 and a key board, etc., and these components are mutually connected by a bus. In the memory 22, a head access program 22a, an oblique test data write program 22b for writing rest data over a plurality of tracks obliquely, a test data read program 22c for adjacent tracks, a peak point detection program 22d for detecting peak point of read voltage and an offset amount calculation program 22e for calculating offset amount between heads, etc., are stored.

Figure 2:
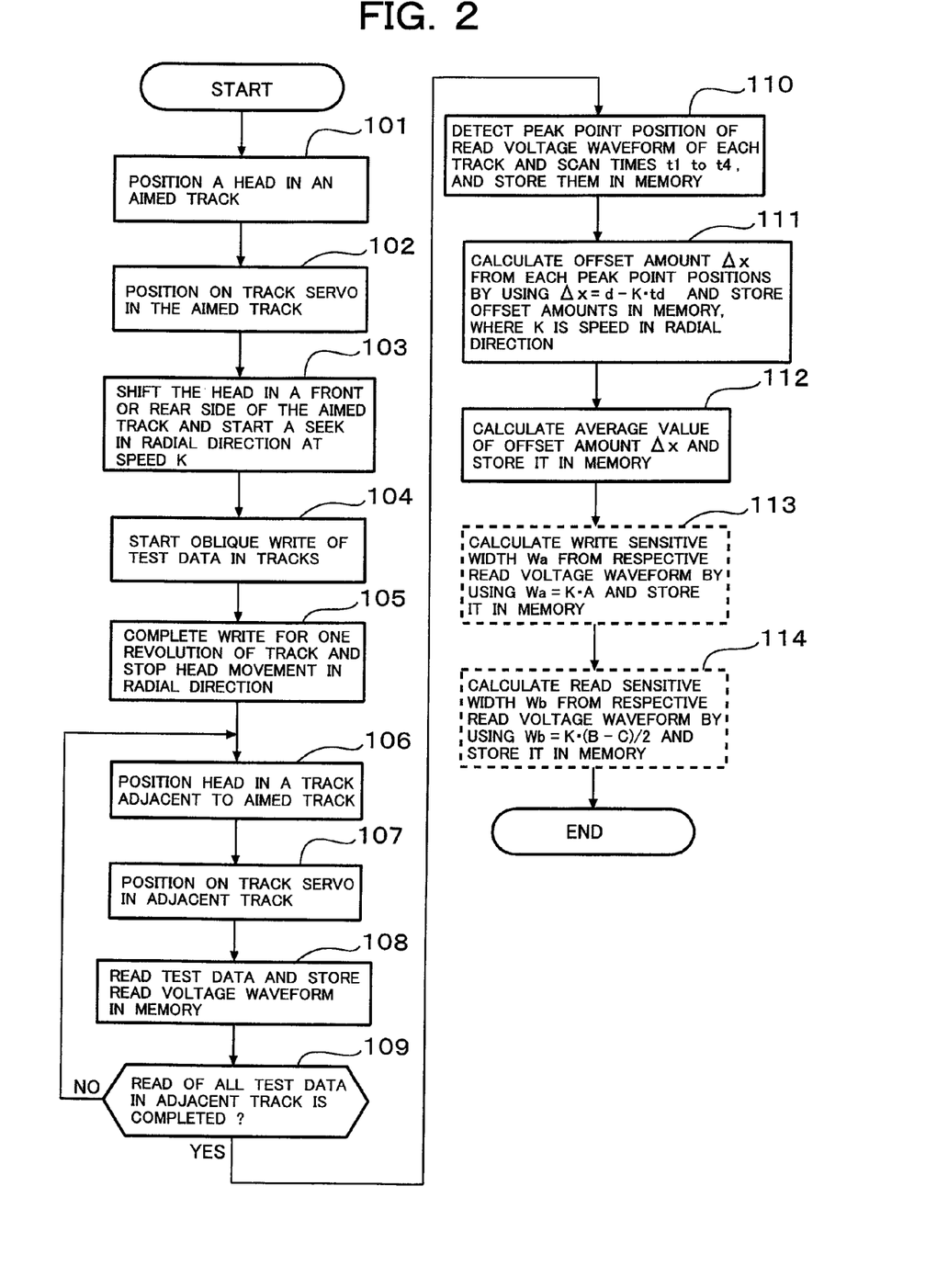
FIG. 2 is a flowchart of an offset amount measuring processing of a test magnetic head.

FIG. 2 is a flowchart of the read characteristics measuring process of the test magnetic head.

The MPU 21 activates the head access control circuit 16 by setting a moving distance r [mm] in a radial direction in a designated register of the head access control circuit 16 through the interface 23 by executing the head access program 22a.

Figure 3A:
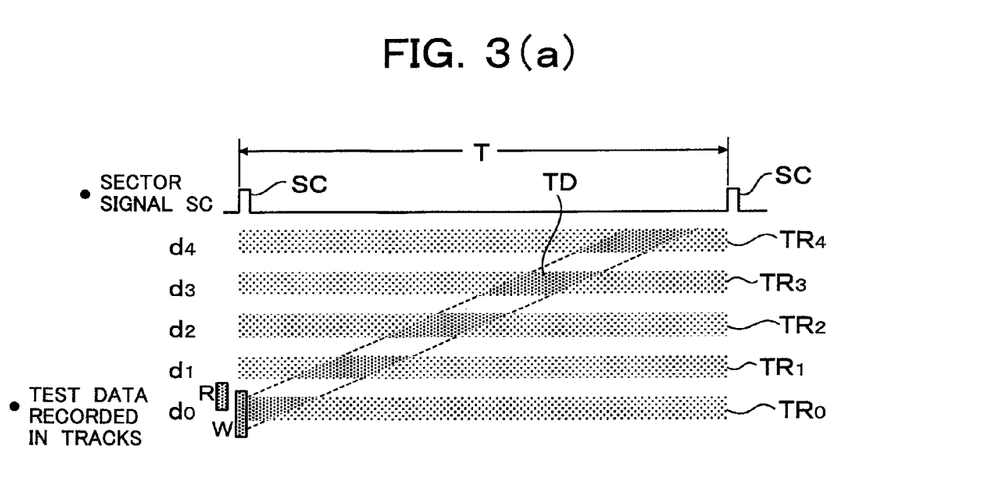
FIG. 3(a) shows an obliquely written test data recorded under the ON track servo control.

By setting the moving distance r [mm] in the radial direction in the register, the X stage 3a is driven by the head access control circuit 16 to roughly move the head from a reference point or a designated track position by r [mm] and then the piezoelectric stage 4 is driven to finely move the head 9 by distance r, so that the head 9 is positioned in an aimed track TR0 (refer to FIG. 3(a)) (Step 101). Therefore, the composite magnetic head 9 is positioned at the center of the aimed track TR0 from the reference point or the designated track position.

The MPU 21 activates the servo positioning control circuit 11 as the ON track positioning control to drive mainly the piezoelectric actuator 7 such that the composite magnetic head 9 is positioned in the aimed track TR0 and drives the piezoelectric actuator 5 (Step 102).

Then, the MPU 21 calls and executes the test data write program 22b over a plurality of tracks and executes the program 22b to seek the head 9 at a designated speed K in radial direction toward an adjacent track before or after the aimed track TR0 (Step 103) by starting a write according to a generation of a sector signal SC (refer to FIG. 3(a)) of the write start signal and to simultaneously start a test data write (Step 104).

FIG. 3(a) shows a recording state of a plurality of tracks including the aimed track TR0.

In FIG. 3(a), the test data write is started in Step 103 in synchronism with the sector signal SC to write a test data TD from the aimed track TR0 to adjacent tracks Tr1 to TR4 obliquely during one revolution of the DTM 1 as shown.

Incidentally, in lieu of the sector signal SC, an index signal IND may be used as the write start signal.

The test data TD is written in the respective tracks obliquely at a designated angle corresponding to the moving speed K in the radial direction of the composite magnetic head 9 and a rotation speed of the DTM 1.

The MPU 21 moves the head 9 obliquely in the radial direction by a distance exceeding several tracks to write the test data for one revolution by the thin film inductive head and stops the movement of the head 9 when the write is ended (Step 105).

In this case, a time T required for one rotation of the DTM 1 becomes a time for which the write head moves across the five tracks including the aimed track TR0.

After the test data write is ended, the MPU 21 calls the test data read program 22c. The MPU 21 executes the program 22c to position the head 9 in the track TR1 adjacent to the aimed track TR0 by seeking the track TR1 (Step 106) and, after the positioning is ended, positions the head 9 in the ON track servo position (Step 107), reads the test data for one track revolution from the track TR1 by the read head according to the generation of the section signal SC and stores a read voltage waveform R1 (refer to FIG. 3(b)) in the memory 22 (Step 108).

Then, the MPU 21 determines whether the read of the test data of the adjacent tracks TR1 to TR4 is ended (Step 109). Since the determination becomes NO initially, the processing is returned to Step 106 and the MPU 21 positions the head in a next track TR2 as the aimed track (Step 106) and further positions the head 9 in the ON track servo position (Step 107). Then, in response to generation of the sector signal SC, a test data in one track from the track TR2 is read out by the read head and a read voltage waveform R2 (refer to FIG. 3(b)) is stored in the memory 22 with the scan time of the track as abscissa (Step 108).

Similarly, according to the judgment in Step 109, the head 9 is sequentially positioned in the track TR3 and then TR4, reads the read voltage waveforms R3 and R4 for one revolution from the track TR3 and from the track TR4 and stores in the memory 22, sequentially (Step 108).

Figure 3B:
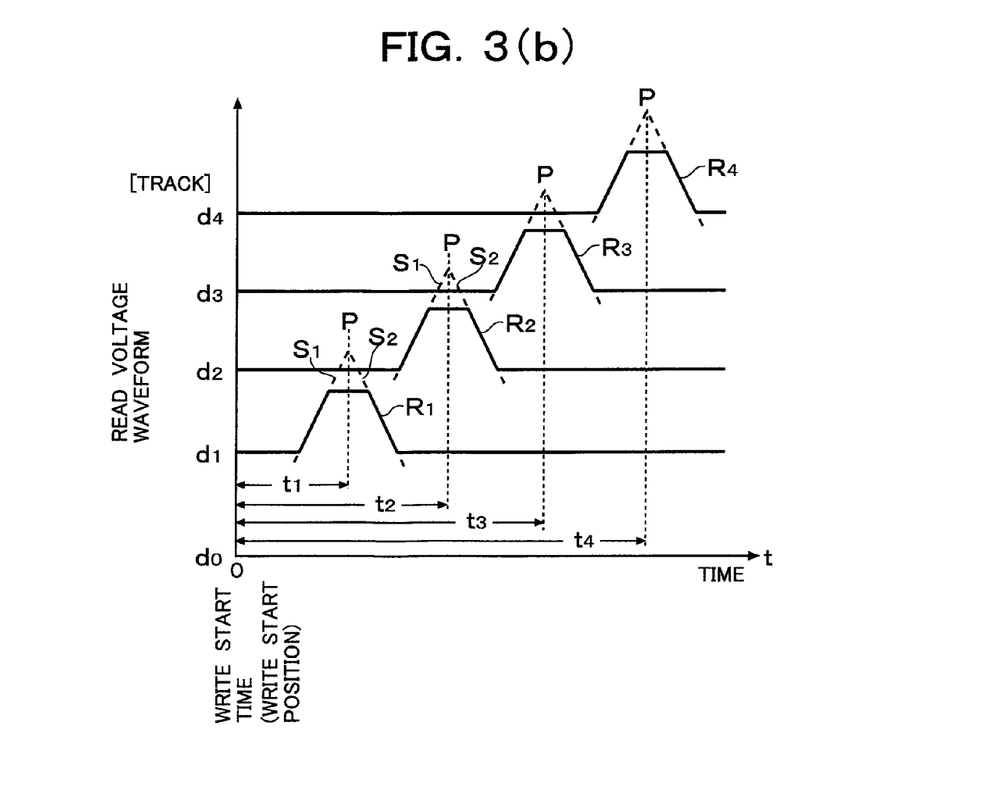
FIG. 3(b) shows a read voltage waveform measured.

As a result, the read waveforms R1 to R4 can be obtained as shown in FIG. 3(b).

In the ordinates axis shown in FIG. 3(b), d0 shows a distance between adjacent track centers and d1, d2, d3 and d4 are the distances from the aimed track TR0 to the track TR1, from the track TR1 to the track TR2, from the track TR2 to the track TR3, from the track TR3 to the track TR4 and from the aimed track TR0 to the track TR4, respectively. The values of d1 to d4 are calculated as differences between the position of the aimed track TR0 and other positions.

As to the read voltage waveforms R1 to R4, the abscissa axis is the scanning time and the ordinates axis is the read voltage. These read voltage waveforms correspond to the read voltage profiles shown in FIG. 5. However, when the recorded test data is oblique, the waveform becomes trapezoidal as shown, because the track width is narrow.

Incidentally, the width of the test data in the scanning direction is determined by a relation between the rotation speed of the track and the moving speed K in the radial direction. In the relation between the movement of the read head and the test data, the ratio of the read voltage profiles is merely changed correspondingly to the obliquity when the record of the test data is oblique.

When the test data is obliquely recorded due to the movement of the write head in radial direction, the border line of the test data recorded according to the moving speed in the radial direction is moved obliquely. Therefore, the movement corresponds to the movement of the write head in the radial direction in that track. The moving time of the write head in the radial direction is from a time when the border line of one recording area enters into the track by this movement (refer to the line of inclination and the write head W on the front side of each track in FIG. 3($a$)) to a time when it leaves from another boarder line (refer to the line of inclination and the write head W on the rear side of each track in FIG. 3($a$)). In the inclined scan, this moving time in the radial direction corresponds to the scan time in the track direction in the inclined scanning. The test data recorded obliquely is merely read out by the read head as it is.

In Step 108, the read voltage waveforms from the respective tracks TR1 to TR4 are collected and, when the judgment in Step 109 becomes YES, the MPU 21 calls and executes the read voltage peak point detection program 22$d$. The MPU 21 detects positions of the peak points of the read voltage waveforms R1 to R4 of the respective tracks, which are stored in the memory, and the scan times t1 to t4 from the generation of the write start signal (refer to the sector signal SC (FIG. 3($a$)) and stores them in the memory (Step 110).

When waveform of the maximum voltage of the read voltage has a flat portion as shown, the peak point position may be set as a center position of the flat portion. However, in this embodiment, the peak point is calculated by obtaining tangential lines S1 and S2 of curved portions (though the both sides of the read voltage waveforms R1 to R4 are shown by linear lines in FIG. 3($b$), these portions become curved lines practically in DTM, BPM, etc., whose track width is narrow) on both sides of the read waveform (read profile) shown in FIG. 3($b$). Incidentally, the tangential lines S1 and S2 may be appropriate linear lines obtained by appropriating the curved portions on the both sides.

That is, the MPU 21 obtains the tangential lines S1 and S2 for the curved portions on both sides of the read voltage between the slice levels of the read voltage assigned in the read voltage waveform, for example, between 20% and 80% (corresponding to the read voltage between the read voltage ratios 0.2 and 0.8 in FIG. 5) and calculates, with using a cross portion P of the tangential lines S1 and S2 as the peak point, the scan time t1 for the peak point for the track TR1, the scan time t2 for the peak point for the track TR2, the scan time t3 for the peak point for the track TR3 and the scan time t4 for the peak point for the track TR4.

The MPU 21 calculates the offset amount Δx between the heads in the track TR1 with using the scan time td=t1, the moving speed K in the radial direction and the distance d between the tracks and stores the offset amount Δx in the memory correspondingly to the read voltage waveform R1 of the track TR1 by using the following equation.

$$\Delta x = d - K \cdot td$$

Then, the MPU 21 calculates the offset amounts Δx of the tracks TR2 to TR4 with using td=t2, td=t3, td=t4 and stores the offset amounts Δx in the memory correspondingly to the read voltage waveforms R2, R3 and R4 of the track TR2 to TR4 (Step 111).

When the offset amounts Δx for the tracks TR1 to TR4 are calculated in this manner, the MPU 21 calculates an average value of the offset amounts Δx for the tracks TR1 to TR4 and stores the average value in the memory 22 (Step 112).

Incidentally, the average value is not always necessary and it is enough to calculate the offset amount Δx of one of the tracks TR1 to TR4.

Even when the record of the obliquely written test data is oblique, the ratio of the read voltage characteristics profile is merely varied correspondingly to the degree of inclination of the test data moving in the radial direction with respect to the vertical direction.

The reason for this is that the test data recorded in the track correspondingly to the moving speed of the write head in the radial direction becomes the inclined record since the front side boarder line (refer to the front inclined line of the tracks and the write head W in FIG. 3($a$)) and the behind side boarder line (refer to the inclined line of the tracks and the write head W in FIG. 3($a$)) are recorded obliquely. The front side boarder line is a recording locus of a top portion of the recording area corresponding to the write sensitive width by the write head and the behind side boarder line is a recording locus of a rear portion of the recording area corresponding to the write sensitive width by the write head.

Incidentally, the write head W and the read head R are shown exaggeratedly in FIG. 3($a$), for the explained reason.

Since all area of the write sensitive width of the test data moving in the radial direction of the write head, is scanned by scanning the test data, which is recorded obliquely, from the front side boarder line to the behind side boarder line by the read head, it is possible to obtain the read voltage waveform (read voltage characteristics profile) and to detect the peak point of the read signal by the read voltage characteristics profile.

Since the read voltage waveforms (read characteristics profile) R1 to R4 in the tracks TR1 to TR4 can be obtained, respectively, it is possible to calculate the moving amount of the read head in the radial direction, that is, the write sensitive width WA=K·A by obtaining the scan time A of the read head in the track scan direction from one end to the other of the tracks at the read voltage 50% of the respective read characteristics profile (Step 113).

Further, it is possible to calculate the read sensitive width Wb of the MP head by using the equation Wb=K·(B−C)/2 by obtaining coordinates values of the track scanning direction (abscissa) between points at which the tangential lines S1 and S2 cross in levels of 0% and 100%, setting the scan time of the read head in the track scanning direction from one end to the other at read voltage 0% of the read characteristics profile as B and setting the scan time of the read head in the track scanning direction from one end to the other at read voltage 100% of the read characteristics profile as C (Step 114).

In this case, the average values of the write sensitive width Wa and the read sensitive width Wb from the tracks TR1 to TR4 may be calculated and stored in the memory 22.

In this embodiment, the peak position of the read voltage is determined by calculating the tangential line of the curved line portions of the opposite sides in the read voltage characteristics. However, it can be calculated from a center position of the waveform characteristics in which the maximum voltage of the read signal has a flat portion.

The discrete track medium (DTM) in this embodiment is a mere example and this invention can be applied to a bit pattern medium (BPM) or a magnetic recording medium having an uneven patterned recording layer.

The invention claimed is:

1. An offset amount measuring method for measuring an offset amount between a write head and a read head of a composite magnetic head, comprising the steps of
writing a test data obliquely in a designated track and at least one track adjacent to the designated track of one of a rotating magnetic recording medium of a discrete track system, a rotating magnetic recording medium of a bit patterned system and a rotating magnetic recording medium having an unevenly patterned recording layer by moving the composite magnetic head positioned in the designated track under ON track servo control in which a servo information is read out from the designated track, at a designated moving speed K in a radial direction of according to a write start signal by crossing the designated track,
reading the test data by the read head by positioning the composite magnetic head in the adjacent track under the ON track servo control,
detecting a peak position in a read signal read out by the read head,
obtaining a scan time of the read head from a starting time of the write start signal to the peak position of the read signal,
obtaining a relative moving distance in the radial direction of the read head with respect to the test data written in an area from a write start position to the peak position of the read signal by multiplying the scan time with the designated moving speed K, and
calculating the offset amount between the heads with using a difference between the relative moving distance and a distance between the designated track and the adjacent tracks.

2. An offset amount measuring method as claimed in claim 1, wherein the adjacent track includes a plurality of tracks, the peak position and the relative moving distance up to the peak position are obtained correspondingly to the adjacent tracks, respectively, the offset amount between the write head and the read head are calculated correspondingly to the respective adjacent tacks, an average value of the offset amount between the heads being used as the offset amount between the heads.

3. An offset amount measuring method as claimed in claim 2, wherein a write sensitive width of the write head and a read sensitive width of the read head are calculated on the basis of a waveform of the read voltage signal.

4. An offset amount measuring method as claimed in claim 1, wherein the write start signal is an index signal or a sector signal and the read signal is a read voltage signal and, when the maximum voltage of the read voltage signal has a flat portion, a center position of the flat portion is detected as the peak position.

5. An offset amount measuring method as claimed in claim 4, wherein a write sensitive width of the write head and a read sensitive width of the read head are calculated on the basis of a waveform of the read voltage signal.

6. An offset amount measuring method as claimed in claim 1, wherein the write start signal is an index signal or a sector signal, the read signal is a read voltage signal and the peak position is detected by calculating tangential lines of both side curved portions of a waveform of the read voltage signal or an appropriate linear line.

7. An offset amount measuring method as claimed in claim 6, wherein a write sensitive width of the write head and a read sensitive width of the read head are calculated on the basis of the waveform of the read voltage signal.

8. An offset amount measuring device for measuring an offset between a write head and a read head of a composite magnetic head, comprising
a spindle for rotating a magnetic recording medium of a discrete track system or a magnetic recording medium of a bit patterned system or a magnetic recording medium having a recording layer of an uneven pattern,
a servo control circuit for performing an ON track servo control for ON tracking a servo information by reading the servo information from a designated track of the rotating magnetic recording medium,
a composite magnetic head positioning mechanism for positioning the composite magnetic head in the designated track during the ON track servo control,
a test data write circuit for writing a test data in the designated track and at least one track adjacent to the designated track by the write head obliquely with respect to the tracks by moving the composite magnetic head across the designated track in a radial direction of the magnetic recording medium at a designated moving speed K,
a test data read circuit for reading the test data by the read head by positioning the composite magnetic head in the adjacent track during the ON track servo control,
peak position detection means for detecting a peak position in a read signal read by the read head, and
offset amount calculation means for obtaining a scan time of the read head from the generation of the write start signal to the peak position of the read signal, obtaining a relative moving distance of the read head in the radial direction with respect to the test data written from the write start position of the test data to the peak position of the read signal by multiplying the scan time with the designated moving speed K, and calculating the offset amount between the write head and the read head by a distance difference between the relative moving distance and the distance between a track center of the designated track and a track center of the adjacent track.

9. An offset amount measuring device claimed in claim 8, wherein the adjacent track includes a plurality of tracks, the peak position detection means detects the peak positions correspondingly to the respective adjacent tracks, the offset amount calculation means obtains the peak position and the relative moving distance up to the peak position correspondingly to the respective adjacent tracks, calculates an offset amount between the write head and the read head correspondingly to the respective adjacent tracks and calculates an average value of the offset amount between these heads as the offset amount of the write head and the read head.

10. An offset amount measuring device claimed in claim 8, wherein the write start signal is an index signal or a sector signal and the read signal is a read voltage signal and, when the maximum voltage of the read voltage signal has a flat portion, a center position of the flat portion is detected as the peak position.

11. An offset amount measuring method as claimed in claim 8, wherein the write start signal is an index signal or a sector signal, the read signal is a read voltage signal and the peak position is detected by calculating tangential lines of both side curved portions of a waveform of the read voltage signal or an appropriate linear line.

* * * * *